United States Patent
Pandit et al.

(10) Patent No.: US 10,628,138 B2
(45) Date of Patent: Apr. 21, 2020

(54) AUTOMATED MANAGEMENT OF UNDESIRED CODE USE BASED ON PREDICTED VALUATION AND RISK ANALYSIS

(71) Applicant: International Business Machines Corporation, Armonk, NY (US)

(72) Inventors: Sushain Pandit, Austin, TX (US); Komminist Weldemariam, Nairobi (KE); Shikhar Kwatra, Morrisville, NC (US); Abdigani Diriye, Nairobi (KE); Paul Krystek, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 15/892,936

(22) Filed: Feb. 9, 2018

(65) Prior Publication Data
US 2019/0250893 A1   Aug. 15, 2019

(51) Int. Cl.
| | |
|---|---|
| G06F 9/44 | (2018.01) |
| G06F 9/445 | (2018.01) |
| G06F 8/41 | (2018.01) |
| G06N 20/00 | (2019.01) |

(52) U.S. Cl.
CPC ............... *G06F 8/41* (2013.01); *G06N 20/00* (2019.01)

(58) Field of Classification Search
CPC .... G06F 8/41; G06F 8/30; G06F 8/20; G06N 99/005; G06N 20/00
See application file for complete search history.

(56) References Cited

U.S. PATENT DOCUMENTS

| | | |
|---|---|---|
| 5,359,659 A | 10/1994 | Rosenthal |
| 5,983,348 A | 11/1999 | Ji |
| 6,189,146 B1 | 2/2001 | Misra et al. |
| 6,275,938 B1 | 8/2001 | Bond et al. |
| 6,915,513 B2 | 7/2005 | Duesterwald et al. |
| 7,698,305 B2 | 4/2010 | Verbowski et al. |
| 7,854,004 B2 | 12/2010 | van der Made |

(Continued)

OTHER PUBLICATIONS

Dong Fugui, The Project Risk Analysis Model based on Neural Network, 2008, pp. 1-3. https://ieeexplore.ieee.org/stamp/stamp.jsp?tp=&arnumber=4679942 (Year: 2008).*

(Continued)

*Primary Examiner* — Mongbao Nguyen
(74) *Attorney, Agent, or Firm* — Scully, Scott, Murphy & Presser, P.C.; Eyal Gilboa

(57) ABSTRACT

Automatically managing ameliorative process that controls undesired code use in an application based on predicted valuation and risk vectors. A multidimensional risk vectors may be received in relation to current and future use of undesired code. Amelioration actions may be classifies by using a custom trained machine learning model. An optimal amelioration action may be selected based on at least one optimization objective function. The selected amelioration action may be taken to control undesired code use in application. Examples of an amelioration action may include changing of the characteristics of a user interface and stopping an application or a component of the application from running.

17 Claims, 10 Drawing Sheets

(56) References Cited

U.S. PATENT DOCUMENTS

| | | | |
|---|---|---|---|
| 7,904,802 B1 | 3/2011 | Kolawa et al. | |
| 9,645,817 B1 | 5/2017 | van Schalk | |
| 9,703,543 B2 | 7/2017 | Thomas et al. | |
| 2008/0243699 A1 | 10/2008 | Hilerio et al. | |
| 2011/0067005 A1* | 3/2011 | Bassin | G06F 11/008 717/127 |
| 2012/0317058 A1* | 12/2012 | Abhulimen | G06N 20/00 706/2 |
| 2016/0155069 A1* | 6/2016 | Hoover | G06Q 30/06 706/12 |
| 2016/0274903 A1 | 9/2016 | Hill | |
| 2016/0321582 A1* | 11/2016 | Broudou | G06Q 10/0635 |
| 2016/0330219 A1* | 11/2016 | Hasan | H04L 63/1408 |
| 2016/0357660 A1* | 12/2016 | Dean | G06F 11/3692 |
| 2017/0046510 A1* | 2/2017 | Chen | G06F 21/552 |
| 2017/0147338 A1* | 5/2017 | Jackson | G06F 8/77 |
| 2017/0155549 A1* | 6/2017 | Bouz | H04L 41/147 |
| 2017/0330109 A1* | 11/2017 | Maughan | G06N 99/005 |
| 2017/0357807 A1* | 12/2017 | Harms | G06F 21/562 |
| 2018/0060580 A1* | 3/2018 | Zhao | G06N 3/0454 |
| 2018/0211727 A1* | 7/2018 | Zarkoob | G06N 20/00 |
| 2018/0275970 A1* | 9/2018 | Woulfe | G06F 8/36 |
| 2018/0276103 A1* | 9/2018 | Woulfe | G06F 11/362 |
| 2018/0300227 A1* | 10/2018 | Bergen | G06F 11/3688 |
| 2018/0322955 A1* | 11/2018 | Sevenster | G06N 20/00 |
| 2018/0341378 A1* | 11/2018 | Morrow | G06F 3/0481 |
| 2019/0028492 A1* | 1/2019 | Coleman | G06N 20/00 |
| 2019/0057284 A1* | 2/2019 | Docherty | G06N 20/00 |

OTHER PUBLICATIONS

Hans-Martin Adorf, A Bayesian Prediction Model for Risk-Based Test Selection, 2015, pp. 374-381. https://ieeexplore.ieee.org/stamp/stamp.jsp?tp=&arnumber=7302477 (Year: 2015).*

Github, Inc., "Licenses", https://choosealicense.com/licenses/, Printed on Feb. 8, 2018, 2 pages.

Wang, K., "You can't get around code scanning if you care about open source licenses", https://blog.fossa.io/you-cant-get-around-code-scanning-if-you-care-about-open-source-licenses-2db1fde43fb5, Feb. 21, 2017, Printed on Feb. 8, 2018, 5 pages.

Wikipedia, "Spaced repetition", https://en.wikipedia.org/wiki/Spaced_repetition, Last edited Jan. 31, 2018, Printed on Feb. 8, 2018, 4 pages.

Borges, H. et al, "Predicting the Popularity of GitHub Repositories", 2016 ACM, Jul. 14, 2016, 11 pages.

Gupta, M., et al., "Predicting future popularity trend of events in microblogging platforms", ASIST 2012, Oct. 28-31, 2012, 10 pages.

Chen, Z., ey al., "Tool Support for Managing Clone Refactorings to Facilitate Code Review in Evolving Software," 2017 IEEE 41st Annual Computer Software and Applications Conference (COMPSAC), Jul. 4-8, 2017, pp. 288-297.

Annosi, M.C., et al., "Managing and Assessing the Risk of Component Upgrades," 2012 Third International Workshop on Product LinE Approaches in Software Engineering (PLEASE), Jun. 2012, pp. 9-12.

Kendall, R.P., "Risk-Based Software Development Practices for CREATE Multiphysics HPC Software Applications," Computing in Science & Engineering, Nov./Dec. 2016, pp. 35-46.

Fendt, O., et al., "Industrial Experience with Open Source Software Process Management," 2016 IEEE 40th Annual Computer Software and Applications Conference (COMPSAC), Jun. 10-14, 2016, pp. 80-185.

Sethanandha, B.D., et al., "Managing Open Source Contributions for Software Project Sustainability," PICMET 2010 Technology Management for Global Economic Growth, Jul. 18-22, 2010, 9 pages.

* cited by examiner

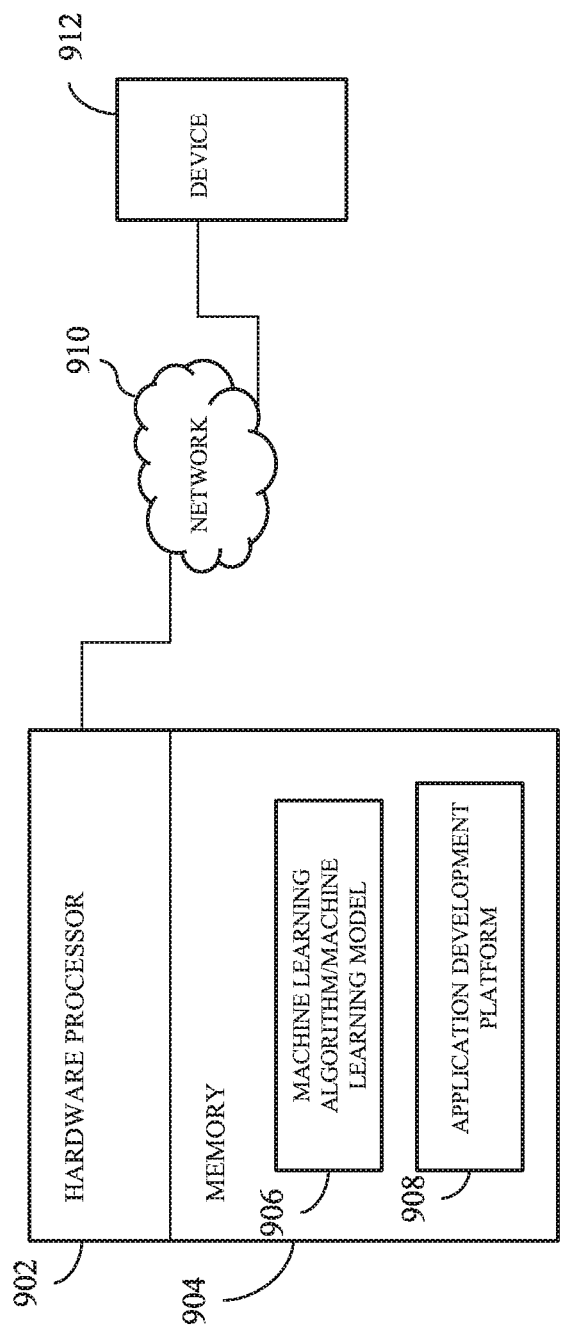

AUTOMATED MANAGEMENT OF UNDESIRED CODE USE BASED ON PREDICTED VALUATION AND RISK ANALYSIS

FIELD

The present application relates generally to computers and computer applications, and more particularly to computer code development environment or platform, and automatically detecting undesired code use and triggering an ameliorating action.

BACKGROUND

Developers may use open source software and or licensed software (first piece of code) in their product software (secondary pieces of code) for reasons such as: (i) to fast track development and go-to-market strategy; (ii) to benefit from extensively tested and widely used software packages, a piece of code, tools; (iii) for easy extendibility, plugability; (iv) to comply with standardization; and/or other reasons. It is also common to see developers of information technology (IT) companies to use a proprietary code, package, tool, in their products. Open source or proprietary tools may include a software license that defines the terms and conditions of use for an application and specifies the rights and obligations of the piece of code or software producer and of the end-user. Types of software licenses may include Proprietary license, GNU General Public License End User License Agreement (EULA), Workstation licenses, Concurrent use license and restrictions, and/or others.

Code scanning is made a part of a software development process to identify a product's code, for instance, in order to identify components contained in a product's code which may need proper licensing or other requirements. Existing code scanning tools apply static and/or dynamic techniques to analyze a code in accordance with the licenses being used and report to the user, as well as alert on a license violation. After scanning a code, existing tools may generate reports. For example, if dependent open source packages get embedded in a primary source tree after a build, like in a/lib directory, these tools gather all component sources together in a directory tree, e.g., including the open source packages, and initiate another toolchain against the dependent packages. Finally, these tools may generate a report for review of compliance. These tools detect keywords and request the scanner to read the line of code and report to reviewers who then need to further investigate, possibly manually. Note that if the code scanner is not careful enough he or she can easily miss an important part of the code review.

Existing code scanning and clearance processes try to analyze source codes and determine potential license violations, and help in performing post-mortem crash dump analysis. Some methods use analytics in order to automatically and remotely turn off code in mobile applications based on problematic context. However, the process of identifying product's code: (i) is still a time consuming task, (ii) prone to risks, (iii) is primarily focused on the current state and context of the code being scanned and the application that use the code, and (iv) does not take into consideration the developer cohort and context.

Challenges still exist in identifying primary and secondary set of codes in software or a product's code. If an undesired code is detected in an application, which for example, is connected with a licensing requirement, there is no mechanism to control the undesired code use in a programmatic way. Thus, there is a need for an improved system and method for smart code clearance assistance, for example, based on prediction, contextual analysis, and cognitive considerations.

BRIEF SUMMARY

A method and system of controlling undesired software code use in an application may be provided. The method, in one aspect, may include receiving a risk vector associated with current and predicted use of undesired code and storing the risk vector on the memory device. The method may also include classifying amelioration actions by executing a custom trained machine learning model on the at least one hardware processor. The method may also include selecting an amelioration action based on at least one optimization objective function. The method may further include automatically executing the amelioration action to control undesired code use in the application.

A system of controlling undesired software code use in an application, in one aspect, may include at least one hardware processor coupled with a memory device. The at least one hardware processor may be operable to receive a risk vector associated with current and predicted use of undesired code and storing the risk vector on the memory device, classify amelioration actions by executing a custom trained machine learning model on the at least one hardware processor, select an amelioration action based on at least one optimization objective function, and automatically execute the amelioration action to control undesired code use in the application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 9 is a flow diagram illustrating a method of managing an ameliorative process that controls undesired software code used in current and/or future applications using predicted valuation and risk vectors in one embodiment.

DETAILED DESCRIPTION

Figure 1:
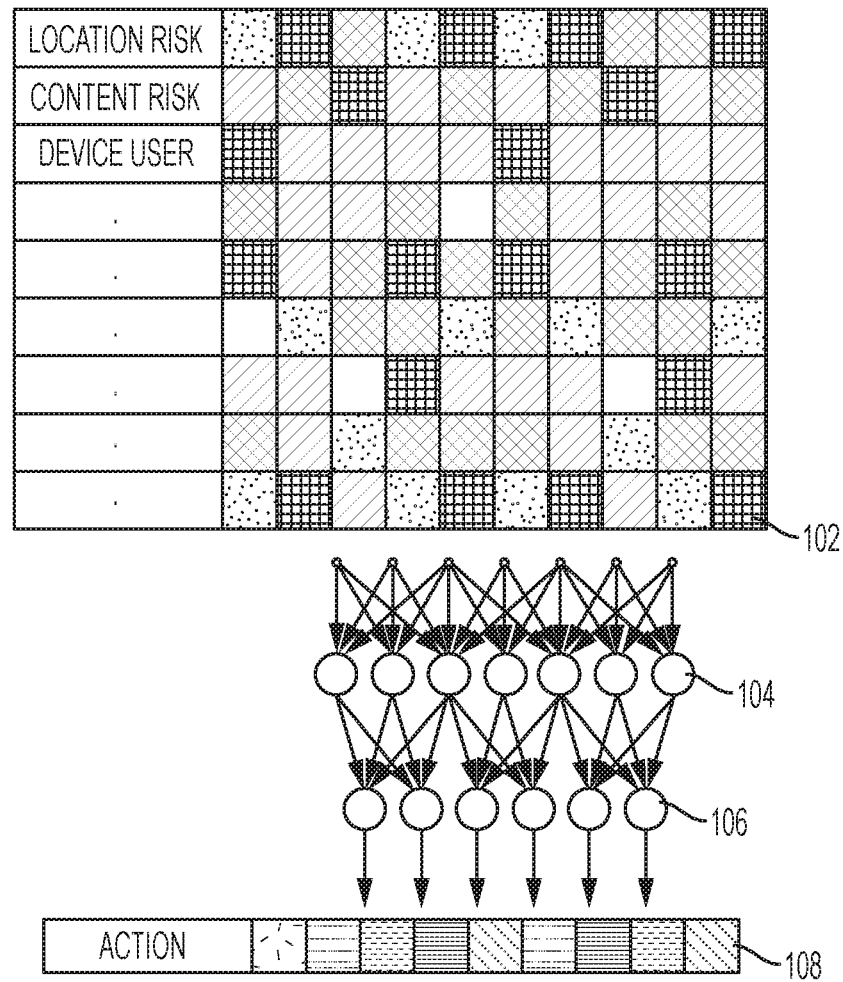
FIG. 1 is a diagram showing an example neural network for training a neural network model to classify, select and optimize ameliorating actions based on detected undesired code in application development in one embodiment.

A method and system are presented that manages ameliorative process of controlling an undesired code use, for example, current and/or future use, in an application. The process of controlling the undesired code use may be based on predicted valuation and risk vectors.

In some embodiment, multidimensional risk vectors in relation to current and future use of undesired code are received, amelioration actions are classified using custom machine learning algorithms or models, an optimal amelioration action is selected based on at least one optimization objective function, and the amelioration action is executed or performed to control the undesired code use in an application. An example of an amelioration action may include changing of the characteristic and nature of a user interface (UI) of an application or device.

In one aspect, educational materials can be generated based on the type of code commit and ameliorating actions to assist the user in avoiding future risks related to undesired code use. The system and method in one aspect enables immediately identifying and classifying undesired use of code in a current product or future product. The system and method may also provides reasons for identifying the code as undesired code to be removed, for example, due to license requirements, protected status of the code, and/or others.

The system and method may be used to improve code clearance tools by taking into consideration various features. It can be used as a cross-vendor service, by configuring and integrating with existing workflow tools in Software Development Environment (e.g., GitHub), Integrated Development Environments (e.g., Eclipse IDE, IntelliJ IDEA), etc.

In one aspect, an undesired use of a code or a set of codes in an application is related to the current, expected and/or predicted violations of one or more legal obligations as specified in licenses associated with the code or set of codes.

The system in some embodiments analyzes multidimensional risk values stored in a multidimensional risk database (along with other metadata related to the code and application) to determine an amelioration action. A multidimensional risk array is an array that has more than two dimensions. For example, a two-dimensional array uses two subscripts for indexing, namely, a row index and a column index, a three-dimensional array uses three subscripts, namely, a rank array dimension 1 (e.g., the row), dimension 2 (e.g., the column) and dimension 3 (e.g., a page); a four-dimensional array has four subscripts (the first two reference a row-column pair; the second two access third and fourth dimensions of data). Generally, as dimensions are added, corresponding subscripts are added. By way of implementation, the multidimensional risk array can be implemented using a relational database technology (e.g., IBM®'s DB2).

A dimension or category of the multidimensional risk array in connection with the undesired code's current and future use in or by an application may include information related to a (particular) brand and image reputation/recognition risk, brand positioning, risk related to loss of loyal customers, user reputation risk, monetary risk, proximity risk, and/or others. Another dimension may be a risk of combination of two or more brands or other items. A further dimension may be a history of violations and code already determined or labelled as a violated part or all terms and conditions stipulated in license terms as well as other policy documents. A further dimension may be events and actions that a developer or group of developers already exchanged in social network, other event sequences that can lead to a potential violation as well as derived risk values from a plurality of data such as historical activities, profile of the developer(s), context and cohort such as related to coding skills. Another dimension may be the risk level or how risky the undesired code is (e.g., how much of damage will it cause to a brand, an image, monetary or a job, a large amount of damage to these list). Other dimensions may include a risk of harm to a company, a risk of a long lasting effect, a risk that an undesired code is actually likely to be part of a sensitive software product. Another dimension may include an associated amelioration action related to the risk values. In some embodiments, the multidimensional array is dynamically updated as a new risk is discovered and/or computed by a configured analysis (e.g., a natural language processing analysis).

The method of analyzing the risk values further generates a risk score vector R corresponding to each risk value. For example, based on the analysis of the undesired code use in an application, for each dimension or category, a predicted probability of how likely the risk to occur and the expected impact may be computed. By way of simple implementation, a risk score R computation can then use a simple algorithm as a function of the probability and expected impact.

Based on the analysis of the risk vectors, if the aggregated risk score R crosses a defined or configured threshold, the system in some embodiments automatically triggers an action generation process. The aggregated risk score R may be an aggregation or combination of all risk score Rs computed for each risk value.

By way of examples, an action may include changing the characteristics of the GUI (e.g., GUI coloration) of the application, triggering an alert for secondary reviewers (e.g., developer, intellectual property professional, manager) of the source code, slowing down the application, preventing the code (and the application) not to compile, run and/or deploy, stopping the code (and the application) from synchronizing with a remote repository, suggesting an alternative code rewriting, auto-deleting (automatically deleting) undesired code, reconfiguring the network and/or others. Reconfiguring the network may include: (i) changing the network (e.g., port) to block the undesired code or a binary containing the undesired code to transmit over the network; ii) changing the network (e.g., port) to redirect transmission of the undesired code or a binary containing the undesired code to a restricted environment for further analysis.

The system further implements a method for classifying and/or prioritizing generated amelioration actions using custom trained machine learning models or algorithms. Given an action space A, and a state space (situation) S, a machine learning algorithm, like neural networks, is used to estimate the confidence in the action(s) to be taken. By way of an example, neural networks such as one shown in FIG. 1 can be used to estimate parameters in order to choose a label (action). The initial training set for classifying amelioration actions can be prepared by a domain expert by using the action templates and mapping the risk metrics to a set of suitable actions. Using this initial training set, model weights are learnt.

Referring to the neural network shown in FIG. 1, for instance, input layer 102 may include different risk factors, which are connected to activation nodes 104 in layer 1. The activation nodes in layer 1 are connected to activation nodes 106 in layer 2, which produce an output of actions 108. In one embodiment, an activation function of a node may include a sigmoid or logistic function, tan h, or rectified linear unit (ReLU), or another activation function. In training the neural network, the weights of the edges connecting the activation nodes are learned based on training examples, for example, via back propagation. The number of layers and activation nodes, and other hyperparameters are configurable and may be updated based on feedback.

After the determined action or actions have been performed, a user feedback is gathered in order to establish whether a predicted action is suitable or not. The learning process also takes into consideration the user's profile (e.g., seniority, number of years in industry, past accuracy, and/or others) and the user's historical actions are also weighted accordingly. Based on the user feedback after a number of initial iterations, a filtered vector space of state and actions are used to re-train the model in order to re-learn an improved classification. This re-training is done on a recurring schedule for ongoing refinement of the learning model. Thus, the system allows for user feedback and intervention at multiple levels to build-in fail-safes if necessary. The frequency of re-training of the model based on the user feedback may be removed or adjusted as the confidence in the learning or classification system improves over time.

In some embodiments, multiple labels (multi-class learning) can be estimated with confidence and the confidence value can further be used to annotate the actions. As an example, actions can be marked higher priority relative to others, or a set of actions can be marked mutually exclusive. In some embodiments, such annotations supersede the output of the learnt model. For example, if 2 actions are marked mutually exclusive and a risk vector gets classified under both actions, the system would only execute the highest priority actions (assuming priority annotation exists).

A machine learning algorithm automatically can be trained to tune the weights of a neural network, a network of activation nodes. The tuning may occur automatically or autonomously without direct intervention from a programmer. Thus, the neural network automatically or autonomously learns to solve a problem, for example, the problem of classifying amelioration actions, which may be difficult if one were to design a conventional program for computer execution.

The following illustrates an example of triggering an action set, which may be executed automatically or autonomously:

Given a generated state space, S={Detected use of undesired code in an application is very low, confidence: 0.8, probability of estimated popularity: 0.4, probability of estimated reputation: 0.1, Computed risk Score R: very low (0.2)}, using the trained neural network, the system can select/generate an action set={Change characteristics of the GUI of the application, Send alert to senior code reviewer, Stop code merging} and trigger the execution of the individual action as needed.

In some embodiments, the actions are determined and performed based on weighted factors and risk analysis.

Figure 2:
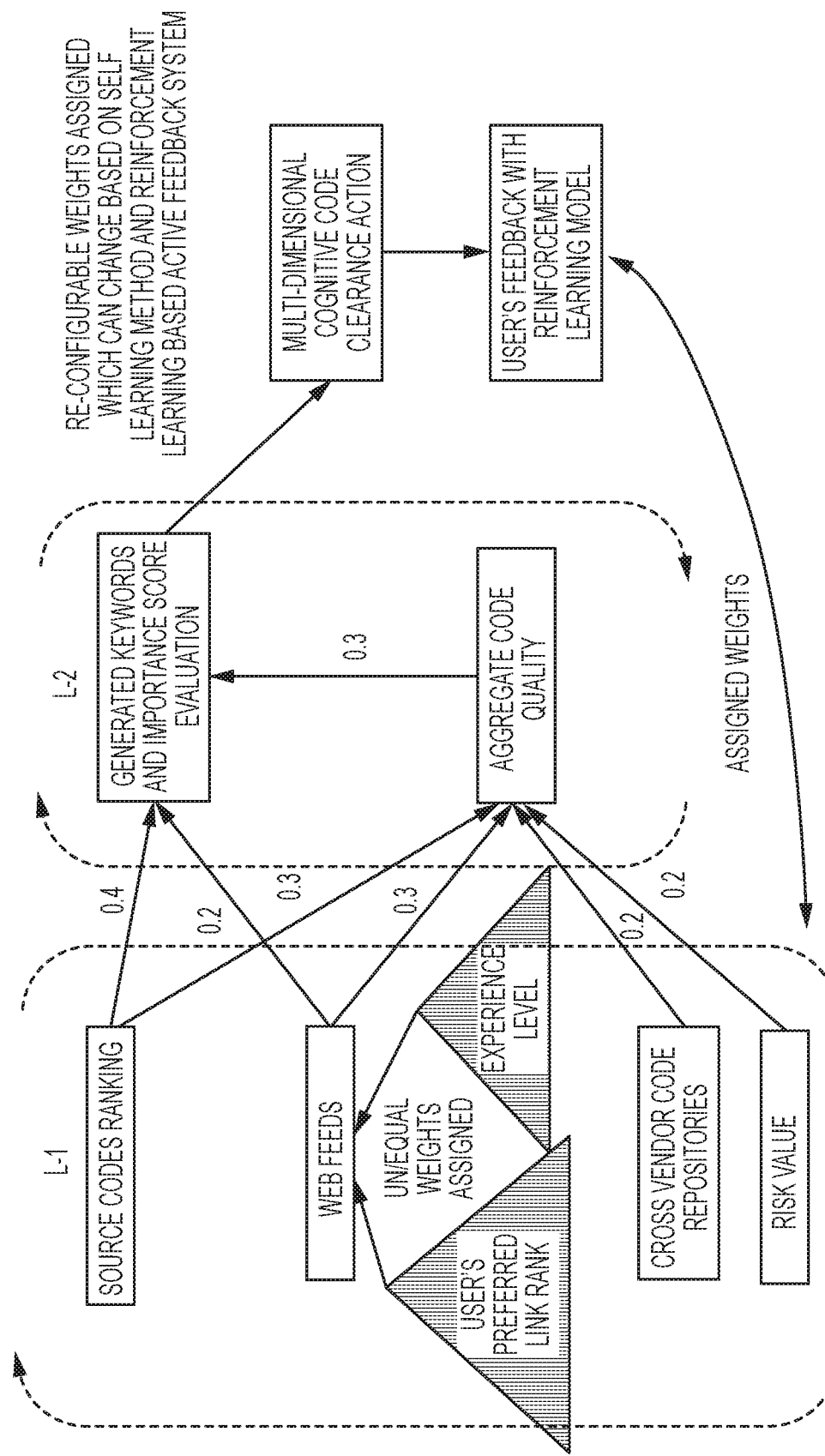
FIG. 2 shows an example neural network system with active feedback in one embodiment.

In one embodiment, the weighted factors are fed in a multi-layer neural network system with active feedback. FIG. 2 shows an example neural network system with active feedback in one embodiment. In FIG. 2, a 3 layer recurrent neural network (RNN) is shown for the purpose of simplicity. Shown in FIG. 2, the method of evaluating the popularity or importance score is based on plurality of reconfigurable weighted factors which determine the overall proficiency of the system and the weighted ameliorative actions that need to be taken based on the established rigidity factor.

The multi-dimensional code clearance actions depict the percentage of risk at different portions of the sections inside the respective code after the training model has run once. After multiple iterations, the training model may be adjusted. As noted above, the user's feedback may determine the final weights which are assigned to the system in order to determine the most accurate vulnerabilities based on the determined code.

FIG. 2 illustrates example input features which include a ranking of different source codes and web feeds. In this example, the amelioration actions are determined based on the ranking of websites like stackoverflow which can be trusted by the user. The automation of rectification of code is determined by monitoring the activity of the user, e.g., the sources which the user is using (trusted websites, preferred links, and/or the like), which are useful in determining the correct sources from which the recommendations for code modification or amelioration actions can be taken and/or used. The training part includes understanding the preferences of the user, e.g., the sources and rankings (e.g., including a search engine ranked trusted links in order of usage and citations of the code), which are frequently used by the user. Feedback mechanism helps in building the confidence level of those respective sources in order to take the ameliorative action. In this example, the neural network algorithm determines an appropriate action which can be taken.

In some embodiments, based on monitoring the user activities (e.g., code commit, code merge) and analyzing historical user activities and events, the learning system may predict the user's next possible actions in relation to the undesired code use, which in turn, may trigger the amelioration action process.

In some embodiments, an action may include changing characteristics of a graphical user interface (GUI) or a user interfere (UI). A GUI (and/or UI) controller may be provided for filtering, delaying, changing of the characteristics and nature of the UI interfaces, devices, and/or the like. In some embodiments, a number of methods are made available to developers, for example, during software development, view the compliance of code under development.

Figure 3A:
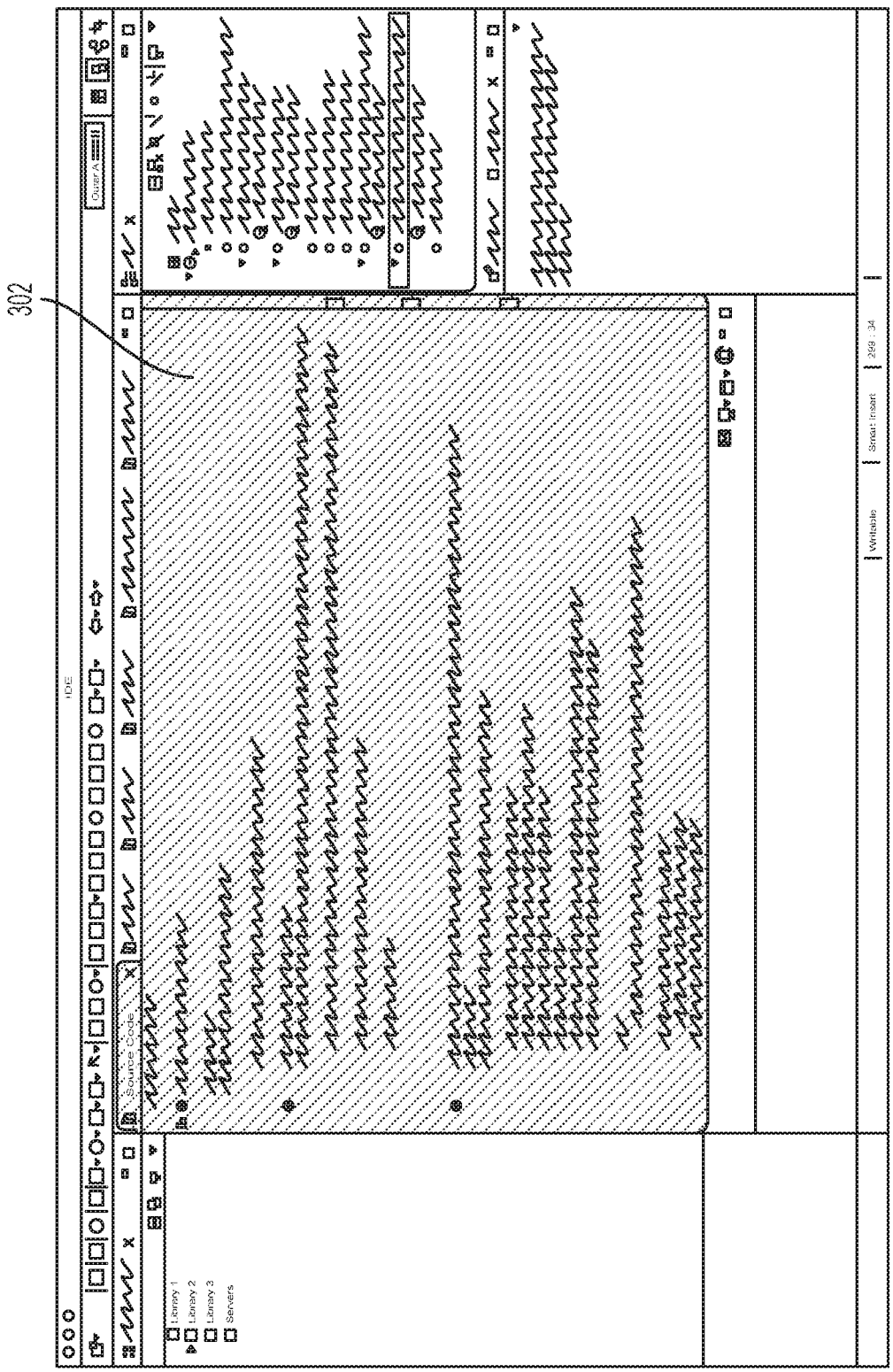
FIGS. 3A and 3B show a graphical user interface (GUI) of an Integrated Development Environment (IDE) extended with the disclosed automated management of undesired code system, wherein examples of non-compliant source code and specific libraries are colorized in FIG. 3A and FIG. 3B, respectively.
Figure 3B:
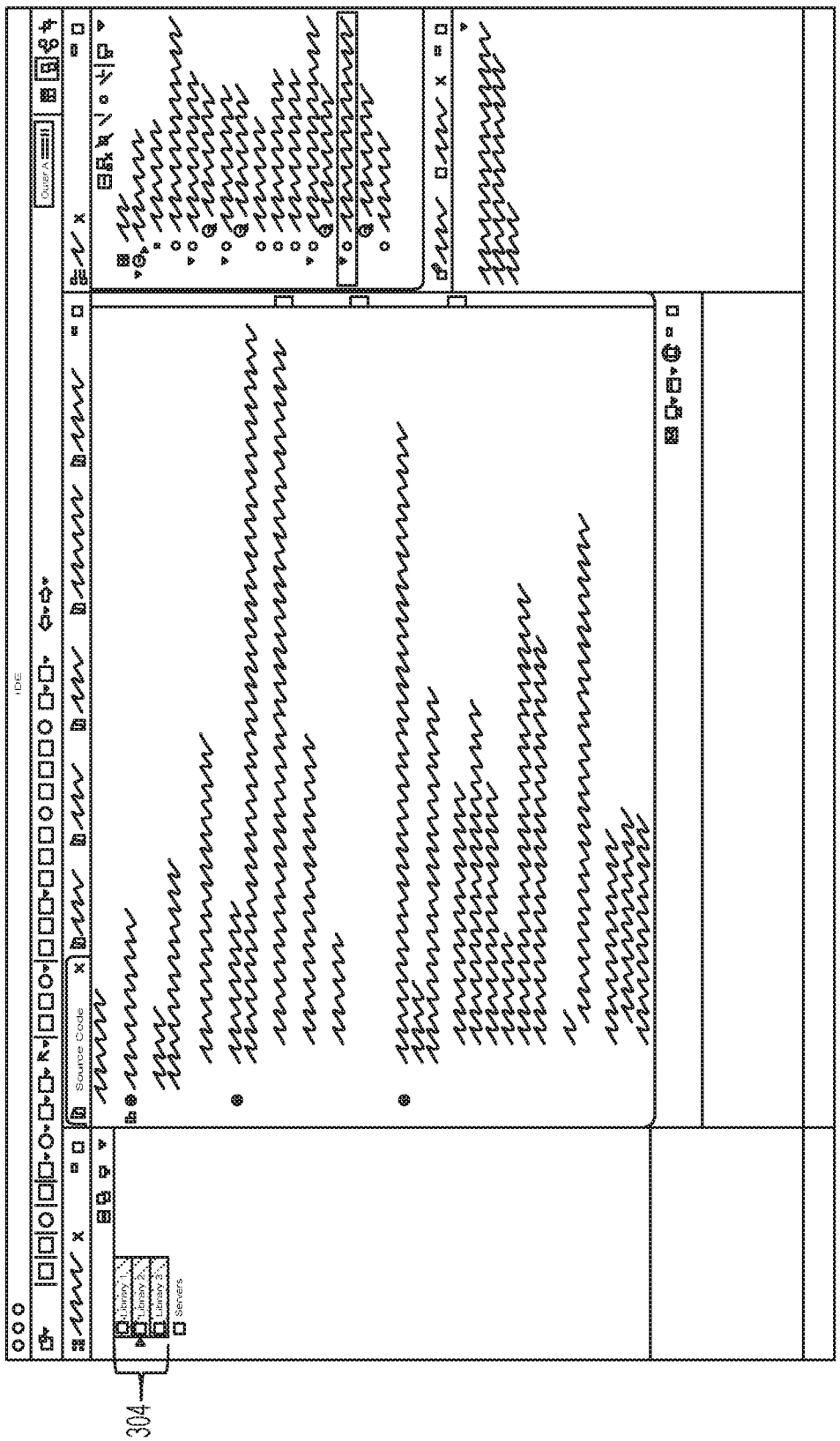

FIGS. 3A and 3B show a GUI of an Integrated Development Environment (IDE). The GUI of FIG. 3A shows non-compliant source code colorized, for example, shown at 302. In FIG. 3B, specific libraries are colorized based on an extension the developer installs, for example, shown at 304. By way of an example, the system may add an extension and/or plugin to a developer's IDE that colorizes (or otherwise distinguishes, e.g., visually) source code that is compliant or non-compliant. The source code is analyzed and the level of compliance, e.g., license violation, is represented on the GUI to the user. As discussed above, the system in some embodiments submits the source code to a computation module that compares it to a repository of libraries and source code and their level of compliance. This is then mapped to a color scheme (e.g., red=non-compliant to green=compliant). Other visualization may be utilized. In some embodiments, different instances of colorization corresponding to different libraries may be presented based on their compliance. This provides higher fidelity by illustrating to the developer the level of compliance of each library or module in the software. This cues the developer to review these libraries and find one or more replacements that are compliant. Thus, the system may recommend an extension and/or plugin libraries or modules for replacement.

Figure 4:
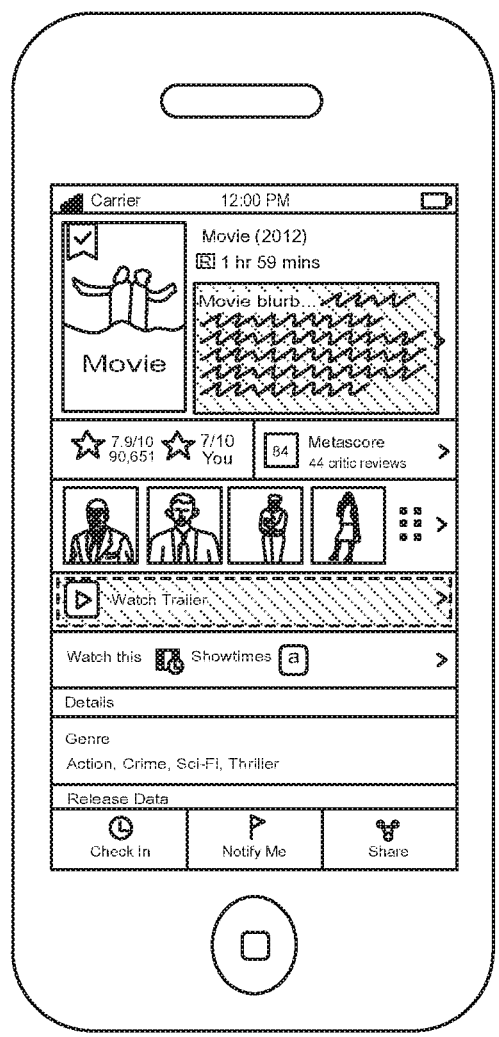
FIG. 4 illustrates an example GUI showing highlights of a library packaged with software in one embodiment.

In some embodiments, an action may include highlighting or disabling a functionality, text and/or feature in software that is compliant or non-compliant (e.g., not complying with licensing requirement) on the output of the software, e.g., as a result of running or executing the software is executing or running. FIG. 4 illustrates a GUI showing highlights of a software library or package within a software product that contains one or more undesired code in one embodiment. For instance, the software library can be included in the software and logs the different functions and library uses, identifies its level of compliance. An amelioration action process of the present disclosure in one embodiment may insert tags to change the appearance on the GUI (e.g., Hypertext Markup Language (HTML) tags like <div style="color=red"></div>). In some embodiments, where the output of the software is textual, the output may be encapsulated with relevant tags and text (e.g., "WARNING! Non-compliant functionality").

Figure 5:
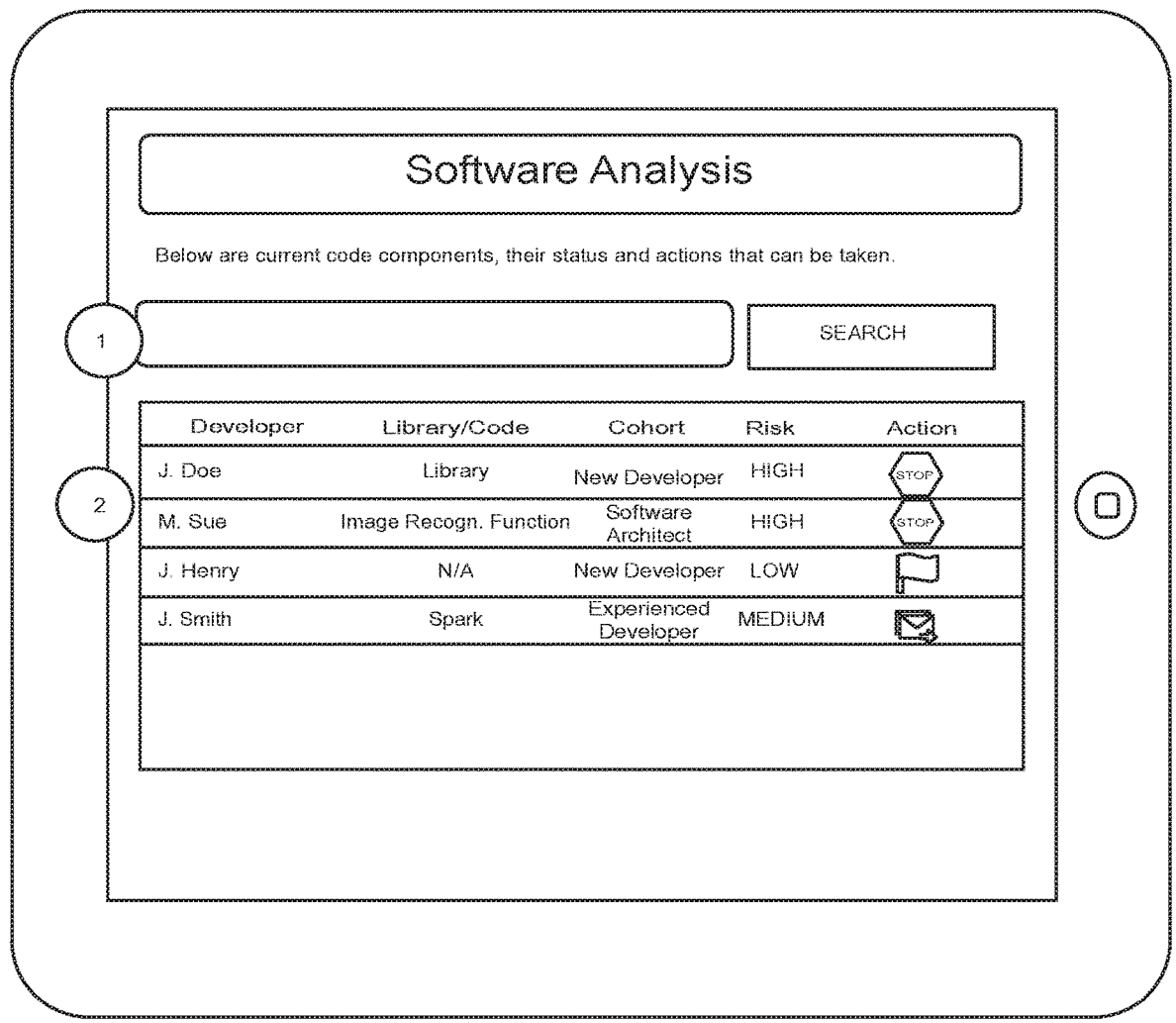
FIG. 5 illustrates an example GUI in one embodiment illustrating software under development, associated compliance, cohort, risk and recommended actions.

FIG. 5 illustrates an example GUI in one embodiment illustrating software under development, associated compliance, cohort, risk and recommended actions. The feature labeled 1 at 502 shows a search box (an input field) where a user can input data to search, for example, by the library, developer name, and/or others. The feature labeled 2 at 504 shows the results and most recent submissions.

As an example, a dashboard for users reviewing software can be disclosed. For example, FIG. 5 illustrates a GUI where a user can view the status of different software. The GUI may include extensions and/or plugins in IDEs, and allows a user to access information concerning the developer, the library in question, an analysis of their cohort (e.g., new developer, experienced developer), the risk of non-compliance and the recommended actions to take. The GUI may display the software under development and their compliance, cohort, risk and recommended actions, and provide a feature such as a search feature and interface showing the results and most recent submissions. For instance, the user can search by the library, developer name, and/or other fields to display results, for example, to assess or review. Examples of actions include, but are not limited to, stop or halt operations, which forcibly stop the software executing when it has been deployed in a live or test environment, sending an email or another notification to a user, flagging or tagging portions of the software for future reference (e.g., in instances where the risk is classified as low), and sending a reminder to follow up. One or more of such actions may be performed automatically or autonomously, for example, which are output by a neural network model.

In some embodiment, the system may automatically generate educational materials. For instance, depending on the ameliorating action, a user profile (e.g., user profile specifying that the user is a developer or a developer community) and cohort, the system may implement a contextual educational feature that can be triggered automatically, for instance, responsive to detecting code violation, or responsive to receiving a request of a user or another who may wish to trigger developers to review a new policy or changes to operations. In some embodiments, the content can be personalized depending on the developer's historic code submissions, cohort, experience level, and type of software submitted (e.g., front-end, machine learning algorithms, back-end, etc.). The personalized and interactive content (e.g., via voice, touch screen, immersive virtual reality or augmented reality, etc.) may be provided to clarify concepts the user has not understood or content relating to why the user's code submission is non-compliant.

By way of an example, when a developer submits code for compliance verification or during the development phase, the risk factor, cohort, historic behavior (e.g., submissions, non-compliance), career stage and experience is processed to determine an amelioration action. Depending on this amelioration action, if the user had violated a specific software compliance standard, then this particular compliance standard would be tied to a given educational material (e.g., content on difference between open source standards). The material can be in a number of different formats (e.g., audio, video, text, virtual reality, etc.). In this example, the developer may receive the educational material through a number of different channels (e.g., email, SMS, call, smartphone, etc.). When the developer completes the educational material, the completion may be recorded and stored on the developer's profile to show the developer has covered this material. In some embodiments, a reminder summarizing the content learnt is sent to the developer periodically, for instance, to improve recall effect. Spaced repetition of material may be sent to a developer to improve recall and compliance in one embodiment. Spaced repetition theory includes a learning technique incorporating increasing intervals of time between subsequent reviews of previously learned material may be used. A reminder to review the learned material may be sent periodically in increasing intervals of time. For example, the material may be learned at day 0, and reminders to review the material may be sent at day 1, day 3 and day 6.

The educational material may be aggregated from online sources (e.g., information found on a website, openly available videos, etc.), created internally for company use, or crowd sourced from other developers and others. In some embodiments, the content is automatically matched and recommended. A ranking algorithm may be automatically executed to order the different material presented to the learner according to the relevance of the ameliorating action, user profile, history, and material click-through and rating.

In one embodiment, another user (e.g., appropriate professional) may mandate the review of new software compliance information or policy to ensure developers are compliant with new changes or ensure routine review of existing software compliance policy by selecting the cohorts of users to be educated. Mandating the review may trigger automatic sending of a notification to learn new material.

Figure 7:
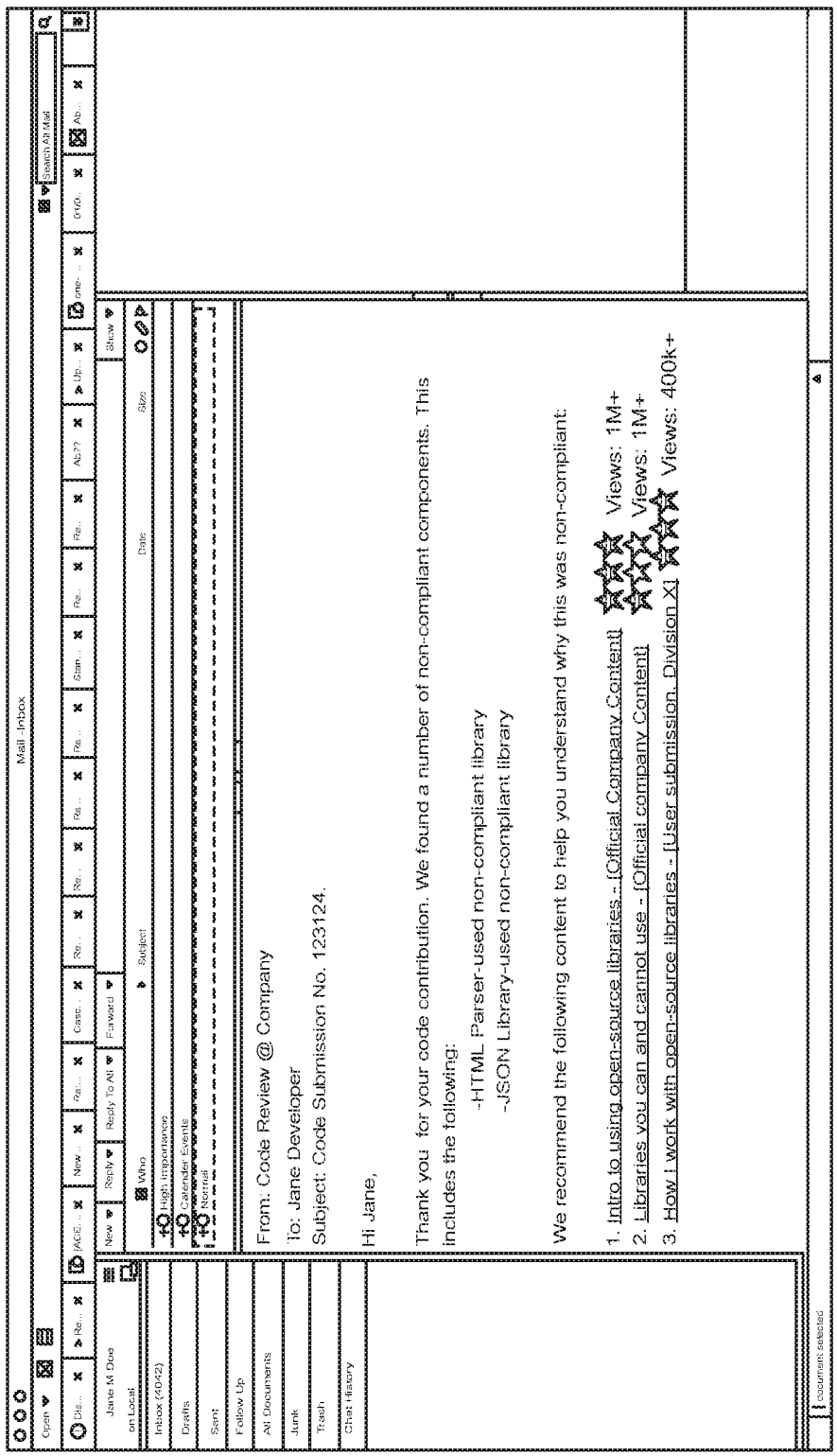
FIG. 7 shows a GUI illustrating a notification sent to a user as an email with a recommendation in one embodiment.

FIG. 7 shows a GUI illustrating a notification sent to a user with a recommendation in one embodiment. The notification (e.g., an email) is automatically generated that notifies the developer of the non-compliant software (e.g., identifying component by component) and the relevant materials that is recommended to be reviewed.

In some embodiments, an automated cognitive code clearance assistance system of the present disclosure may be configured and integrated with an existing workflow tool such as a software development platform, for example, as a cross-vendor service. Examples of existing software development platforms or workflow tools include GitHub from GitHub, San Francisco, Calif., JIRA from Atlassian Corporation, Sydney, Australia, and Slack from Slack Technologies, Vancouver, Canada.

Figure 8:
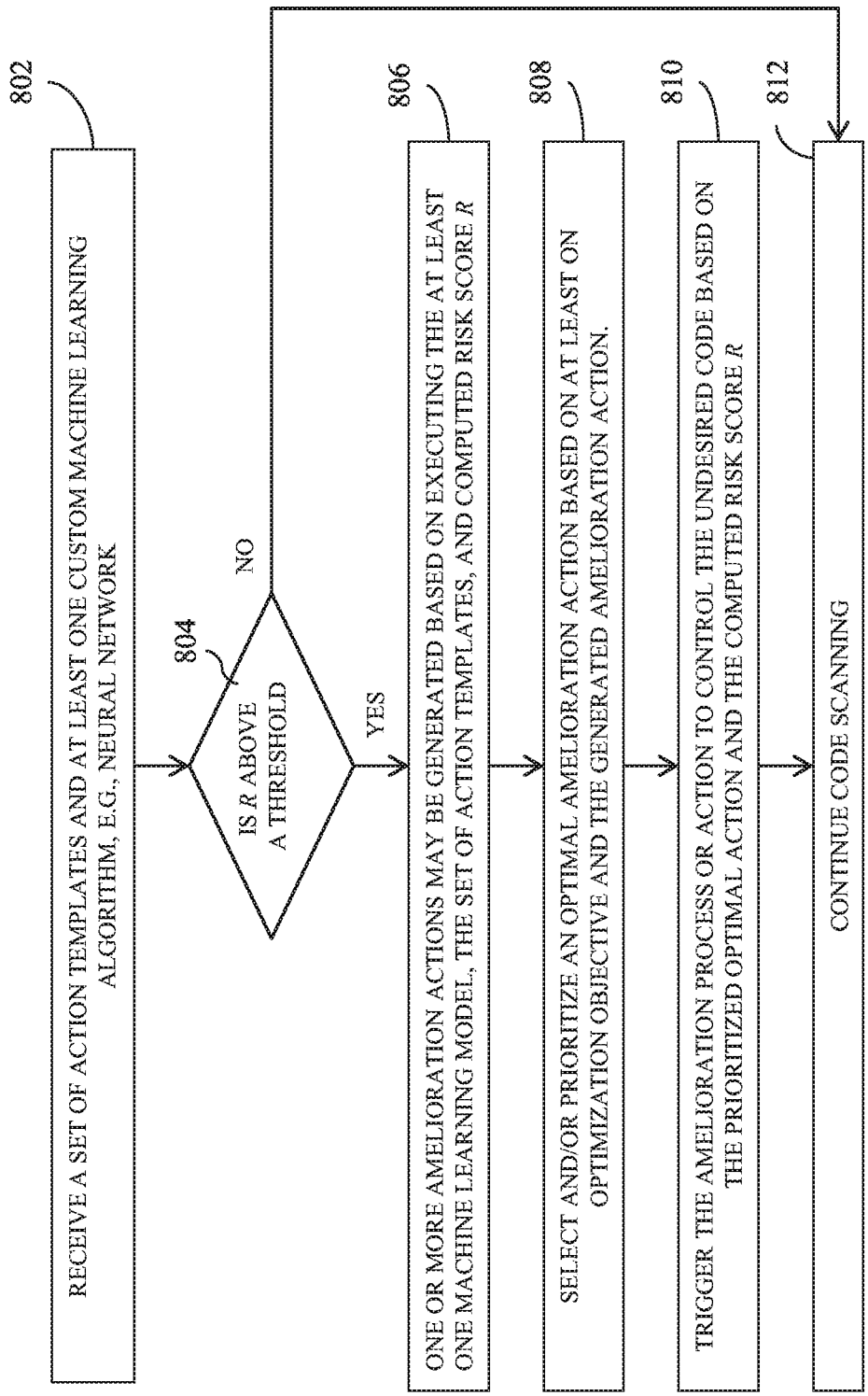
FIG. 8 is a flow diagram illustrating a method of controlling predicted undesired code use in one embodiment.

FIG. 8 is a flow diagram illustrating a method of controlling predicted undesired code use in one embodiment. At 802, a set of action templates and at least one custom machine learning model trained by a machine learning algorithm is received. An example of a machine learning algorithm is neural networks, which for example, trains a neural network model. A multidimensional risk vector in relation to current and future use of undesired code may be also received. An aggregated risk score R is computed using multidimensional risk array. A neural network, for example, learns changes made by a user in a code. If the user is changing a piece of code with alternatives from a ranked website or based on instructions from an alternate source, the source and/or ranked website is recorded along with an amelioration action. The next time a similar undesired code is witnessed during code scanning, the amelioration action may be taken automatically. The processing at 802 may also include code scanning in conjunction with recording the user's activities and ranked feeds and/or changes.

At 804, it is determined as to whether a risk score R is above a threshold by comparing the computed risk score R against predetermined (e.g., as part of the received data) threshold value. If the risk score R is above a threshold, the processing continues to 806. If the risk score R is not above a threshold, the processing continues to 812.

At 806, one or more amelioration actions may be generated or selected from an available list, based on executing the at least one machine learning model (e.g., which outputs classification of amelioration actions), the set of amelioration actions, and the computed risk score R. For instance, amelioration actions may be generated and classified.

At 808, an optimal amelioration action may be selected and/or prioritized based on at least one optimization objective function and the generated amelioration action. An optimization objective function may be an objective that advances a company's goal and/or guidelines. For instance, as discussed with reference to 810 below, once the risk code analysis is performed, the code may be adjusted or modified to comply with a company's guidelines. A piece of code may be rectified based on historical patterns of the user or monitored sources which was learnt by the neural networks algorithm. Examples of an optimization objective function may include expectation-maximization algorithm, gradient descent, stochastic hill climbing, and/or others. In this context, an optimization objective function is used to optimize a selection of an amelioration action. For instance, an optimization objective function is used to find the optimal amelioration action that reduces or minimizes a specified risk.

At 810, the amelioration action or process is triggered or executed automatically to control the undesired code use in an application based on the prioritized optimal action and the computed risk score R. A piece of code, which for example, does not comply with a company's guidelines, or which for example, may be incorrect, may be modified automatically based on the historical pattern learning mechanism and amelioration actions. In another aspect, a piece of code, which may not be required during the execution of the application, may be appropriately commented, indented and/or modified, so that the code does not interfere with other functioning features. The prioritization of action may be based on the steps or actions, which need to be performed during a step by step execution in order to prevent any damage to the working code. The prioritization may be based on space, memory usage, whether the code is needed or not. For instance, an optimization action that takes up less space and memory usage may be prioritized before an optimization action that takes up more space and memory usage. Taking the amelioration action controls undesired code use in an application.

At 812, code scanning continues. For instance, the system of the present disclosure may identify the undesired code at a point in a block of code, e.g., at line number 100 of the software. The system of the present disclosure performing a code analysis may have scanned and identified that the piece of code is undesired. The system of the present disclosure in one embodiment may take an appropriate action and notify the user in the GUI regarding that part of the code. Then, the system may continue the scanning further. In one aspect, the method may be performed per block of code in software or application, for example, from top to bottom and displayed in a conglomerated fashion in the GUI based on user's preferences.

The process shown in FIG. 8 may manage an ameliorative process that controls undesired software code used in current and/or future applications using predicted valuation and risk vectors in one embodiment.

Examples of an amelioration action may include changing of the characteristics and/or nature of UI interfaces or devices. For example, GUI characteristics such as GUI coloration of the application that includes the undesired code may be changed. Other examples of an amelioration action may include, but are not limited to: triggering an alert for secondary reviewers or approval of the source code; preventing the code (and the application) not to compile, deploy, or run; stopping the undesired code (and the application) to synchronize with a remote repository; suggesting an alternative code rewriting, auto-deleting the undesired code.

Generating one or more actions to control undesired software code use (e.g., current and future use) may be performed by analyzing multidimensional risk values stored in a multidimensional risk database (along with other metadata related to the code and application) and using action templates. For instance, as part of the functioning of neural networks algorithm, multidimensional risk values are taken into consideration and fed as inputs along with user's activities which determine the action templates which are suggested initially. Once the user takes any action, those actions are recorded and stored as preferences in the form of a learning feedback so that a recommended action can be taken later automatically.

In some embodiments, the machine learning model may be further trained to classify assessed valuation and risk vectors into actions that can be taken as part of the amelioration process.

In some embodiments, user feedback may be gathered to help define the training set for said model and improve it over time. For instance, a user interface may be provided that is associated with an IDE or another program development tool, via which a user may input feedback of whether taking the recommended amelioration action was effective.

In some embodiments, an amelioration action may include a controlling action which may be predicted based on user commands (e.g., predicted code commit at a given time of the day) that represent the user's next possible actions via active learning and feedback from a user or cohort.

As described above, the system and/or method of the present disclosure may provide cognitive code clearance assistance system or method. Such cognitive code clearance assistance methodology may be configured and/or integrated, for example as a cross-vendor service, with an existing workflow tool. In one aspect, GUI elements may be configured and/or integrated with such workflow tool, for instance, which allow for operations and displaying of amelioration actions. Yet in another aspect, a GUI element may be integrated into a workflow tool, for controlling execution of the method, for example, described above with reference to FIG. 8. For instance, an existing workflow tool may include modified GUI that integrates the methodologies of the present disclosure in some embodiments.

In some embodiments, a set of educational materials may be generated for a user (e.g., developer) based on a risk associated with the current and/or future undesired code use in an application. In some embodiments, the education materials may be adjusted for a user based on the amelioration actions, cohort, user profile, and user preferred content delivery (e.g., video, presentation, email, SMS, call, and/or others).

In some embodiments, a summary of risk mitigation results may be created in one or more ways singly or in combination (e.g., temporal, coding group, coder, location, type of amelioration action taken). For instance, based on user's preferences or selected and/or configured templates, a report and/or summary may be generated highlighting the results and/or modifications.

FIG. 9 is a diagram illustrating components of a system that controls undesired code use in one embodiment. At least one hardware processor 902 may be coupled with a memory device 904. A machine learning algorithm may execute on the hardware processor 902 and generate a machine learning model (e.g., shown at 906). The algorithm and the trained model may be stored on a memory device 904 and execute on a processor such as a central processing unit (CPU) and/or a graphics processing unit (GPU), and/or another processor. An application, code or software development platform 908 may run on a hardware processor and allow a user or a code developer to develop an application. For instance, the platform 908 or like tool may provide a user interface via which a user may write a code for an application, compile the code, and debug the code, e.g., in creating a final product, e.g., an application that can run on a runtime machine or device. For instance, the application may be downloaded or transferred via a network 910 to a device 912 such as a user device, for example, a user's laptop, personal computer, and/or a smart phone. The application, for example, may include a user interface for interacting with a user running the application.

The hardware processor 902 receives a risk vector associated with current and predicted use of undesired code and may store the risk vector in memory (e.g., 904). The hardware processor 920 may classify amelioration actions by executing a custom trained machine learning model, e.g., 906. The hardware processor 902 may select an amelioration action based on at least one optimization objective function, and automatically execute the amelioration action to control undesired code use in the application. For instance, the amelioration action may include changing a display characteristic of a user interface associated with the development platform 908 running, and the hardware processor 902 may execute the amelioration action while the application is being developed via the development platform 908. In another aspect, the application development platform may run on another hardware processor or computer, e.g., different from the hardware processor on which the machine learning algorithm was executed to generate the machine learning model. In another aspect, the amelioration action may include changing a characteristic of a user interface associated with the application, and the amelioration action is executed on a device 912 running the application while the application is running. Examples of other amelioration actions may include, but are not limited to, stopping the application from running on a device 912, rewriting the undesired code automatically by a development platform 908, deleting the undesired code automatically by the development platform 908, suggesting an alternative code automatically by the development platform 908, stopping an application code comprising the undesired code from compiling by the development platform 908, triggering an alert by the development platform 908, or generating educational material comprising interactive content and pushing the educational material to a user to allow the user to avoid future risks associated with the undesired code use, or combinations thereof.

Figure 6:
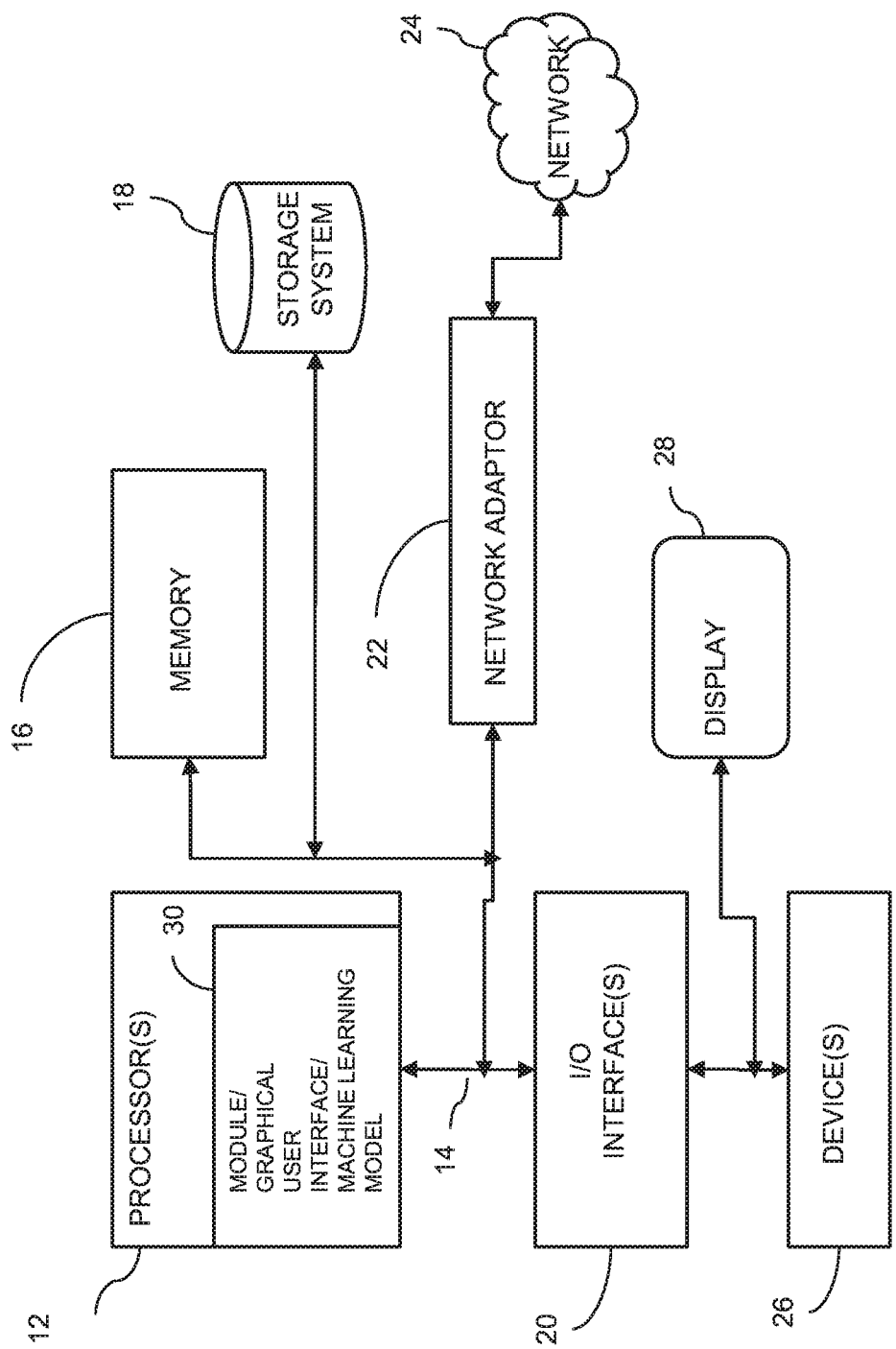
FIG. 6 illustrates a schematic of an example computer or processing system that may implement a system that controls undesired code use in an application in one embodiment of the present disclosure.

FIG. 6 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of controlling undesired software code use in an application, the method executed by at least one hardware processor coupled with a memory device, the method comprising:
receiving a risk vector associated with current and predicted use of undesired software code and storing the risk vector on the memory device, the risk vector comprising a multi-dimensional array of risks in different dimensions;
classifying amelioration actions by executing a custom trained machine learning model on the at least one hardware processor, the risk vector input to the custom trained machine learning model, the custom trained machine learning model outputting a classification of amelioration actions;
selecting an amelioration action based on at least one optimization objective function; and
automatically executing the amelioration action to control undesired software code use in the application,
wherein the amelioration action comprises generating educational material comprising interactive content, and pushing the educational material comprising the interactive content to a user to allow the user to avoid future risks associated with the undesired software code use,
wherein responsive to the user completing the educational material, completion is recorded in a user profile to show the user has covered the education material.

2. The method of claim 1, wherein the amelioration action comprises changing a display characteristic of a user interface associated with a development platform, and the amelioration action is executed on a computer running the development platform while the application is being developed.

3. The method of claim 1, wherein the amelioration action comprises changing a characteristic of a user interface associated with the application, and the amelioration action is executed on a device running the application while the application is running.

4. The method of claim 1, wherein the amelioration action comprises stopping the application from running on a device.

5. The method of claim 1, wherein the amelioration action comprises at least one of rewriting the undesired software code automatically by a development platform, deleting the undesired software code automatically by the development platform or suggesting an alternative software code automatically by the development platform, and stopping an application software code comprising the undesired software code from compiling by the development platform.

6. The method of claim 1, wherein the amelioration action comprises triggering an alert.

7. The method of claim 1, wherein the steps of the method are integrated, as a cross-vendor service, with a workflow tool, wherein the workflow tool comprises graphical user interface elements for presenting the amelioration action.

8. A non-transitory computer readable storage medium storing a program of instructions executable by a machine to perform a method of controlling undesired software code use in an application, the method executed by at least one hardware processor coupled with a memory device, the method comprising:
receiving a risk vector associated with current and predicted use of undesired software code and storing the risk vector on the memory device, the risk vector comprising a multi-dimensional array of risks in different dimensions;
classifying amelioration actions by executing a custom trained machine learning model on the at least one hardware processor, the risk vector input to the custom trained machine learning model, the custom trained machine learning model outputting a classification of amelioration actions;
selecting an amelioration action based on at least one optimization objective function; and
automatically executing the amelioration action to control undesired software code use in the application,
wherein the amelioration action comprises generating educational material comprising interactive content, and pushing the educational material comprising the interactive content to a user to allow the user to avoid future risks associated with the undesired software code use, wherein responsive to the user completing the educational material, completion is recorded in a user profile to show the user has covered the education material.

9. The non-transitory computer readable storage medium of claim 8, wherein the amelioration action comprises changing a display characteristic of a user interface associated with a development platform, and the amelioration action is executed on a computer running the development platform while the application is being developed.

10. The non-transitory computer readable storage medium of claim 8, wherein the amelioration action comprises changing a characteristic of a user interface associated with the application, and the amelioration action is executed on a device running the application while the application is running.

11. The non-transitory computer readable storage medium of claim 8, wherein the amelioration action comprises stopping the application from running on a device.

12. The non-transitory computer readable storage medium of claim 8, wherein the amelioration action comprises at least one of rewriting the undesired software code automatically by a development platform, deleting the undesired software code automatically by the development platform and suggesting an alternative software code automatically by the development platform, stopping an application software code comprising the undesired software code from compiling by the development platform.

13. The non-transitory computer readable storage medium of claim 8, wherein the amelioration action comprises triggering an alert.

14. A system of controlling undesired software code use in an application, comprising:
  at least one hardware processor coupled with a memory device,
  the at least one hardware processor operable to receive a risk vector associated with current and predicted use of undesired software code and storing the risk vector on the memory device, the risk vector comprising a multi-dimensional array of risks in different dimensions;
  classify amelioration actions by executing a custom trained machine learning model on the at least one hardware processor, the risk vector input to the custom trained machine learning model, the custom trained machine learning model outputting a classification of amelioration actions;
  select an amelioration action based on at least one optimization objective function; and
  automatically execute the amelioration action to control undesired software code use in the application,
  wherein the amelioration action comprises generating educational material comprising interactive content, and pushing the educational material comprising the interactive content to a user to allow the user to avoid future risks associated with the undesired software code use,
  wherein responsive to the user completing the educational material, completion is recorded in a user profile to show the user has covered the education material.

15. The system of claim 14, wherein the amelioration action comprises changing a display characteristic of a user interface associated with a development platform running on the at least one hardware processor, and the amelioration action is executed while the application is being developed.

16. The system of claim 14, wherein the amelioration action comprises changing a characteristic of a user interface associated with the application, and the amelioration action is executed on a device running the application while the application is running.

17. The system of claim 14, wherein the amelioration action comprises at least one of stopping the application from running on a device, rewriting the undesired software code automatically by a development platform, deleting the undesired software code automatically by the development platform, suggesting an alternative code automatically by the development platform, stopping an application software code comprising the undesired software code from compiling by the development platform, and triggering an alert.

* * * * *